United States Patent
Ekstrand

(10) Patent No.: US 10,865,131 B2
(45) Date of Patent: Dec. 15, 2020

(54) METHOD AND ARRANGEMENT FOR DEWATERING SLUDGE

(71) Applicant: Elajo Technology Solutions AB, Oskarshamn (SE)

(72) Inventor: Stefan Ekstrand, Vaxjo (SE)

(73) Assignee: Elajo Technology Solutions AB, Oskarshamn (SE)

( * ) Notice: Subject to any disclaimer, the term of this patent is extended or adjusted under 35 U.S.C. 154(b) by 151 days.

(21) Appl. No.: 16/102,823

(22) Filed: Aug. 14, 2018

(65) Prior Publication Data

US 2020/0010350 A1  Jan. 9, 2020

(30) Foreign Application Priority Data

Jul. 4, 2018  (EP) .................................. 18181726

(51) Int. Cl.
   *C02F 11/12* (2019.01)
   *C02F 1/00* (2006.01)
   *C02F 11/20* (2006.01)

(52) U.S. Cl.
   CPC .............. *C02F 11/12* (2013.01); *C02F 1/008* (2013.01); *C02F 11/20* (2013.01); *C02F 2209/02* (2013.01); *C02F 2209/30* (2013.01)

(58) Field of Classification Search
   CPC ...... F26B 3/00; F26B 3/08; F26B 5/00; F26B 5/06; F26B 21/00; F26B 21/06; F26B 25/00; C02F 11/12; C02F 1/008; C02F 2209/02; C02F 2209/30
   USPC ......................................................... 34/284
   See application file for complete search history.

(56) References Cited

U.S. PATENT DOCUMENTS

| | | | | |
|---|---|---|---|---|
| 3,817,048 A | * | 6/1974 | Burley | B01D 9/0059 62/64 |
| 5,208,998 A | * | 5/1993 | Oyler, Jr. | F26B 3/12 159/4.01 |
| 5,335,425 A | * | 8/1994 | Tomizawa | F26B 3/347 34/265 |

(Continued)

FOREIGN PATENT DOCUMENTS

| | | | | |
|---|---|---|---|---|
| CA | 2888921 C | * | 8/2015 | ............. F26B 5/048 |
| EP | 2920533 B1 | * | 6/2018 | ............. A23B 4/01 |
| WO | WO-2010102802 A1 | * | 9/2010 | ............. F26B 5/06 |

OTHER PUBLICATIONS

Dewatering of Sludge by Freeze Drying by Ottavio Franceschini 2010.*

*Primary Examiner* — Stephen M Gravini
(74) *Attorney, Agent, or Firm* — Olive Law Group, PLLC

(57) ABSTRACT

A method and an arrangement for processing sludge into sludge residue having a targeted dry solid concentration is provided. The method comprises a step of distributing (110) provided sludge for continuous transport in a specific form factor; cooling (120) the distributed sludge into a frozen state using a refrigerating medium; thawing (140) the frozen sludge using a first heating medium; drying (150) the thawed sludge to a targeted dry solid concentration, wherein at least one aspect of the method is controlled by a processing parameter, the method further comprising the step of monitoring (160) at least one processing parameter, and adjusting (170) at least one processing parameter with respect to a corresponding reference value based on said at least one sludge characteristic or user input to improve sludge processing.

14 Claims, 2 Drawing Sheets

(56) References Cited

U.S. PATENT DOCUMENTS

| | | | | | |
|---|---|---|---|---|---|
| 5,456,022 | A | * | 10/1995 | McLeod | B01D 5/0039 |
| | | | | | 34/468 |
| 5,614,107 | A | * | 3/1997 | Mallia, Jr. | F26B 5/065 |
| | | | | | 210/771 |
| 5,660,055 | A | * | 8/1997 | Eriksson | B09C 1/00 |
| | | | | | 62/260 |
| 5,974,821 | A | * | 11/1999 | Scherer | A23L 2/12 |
| | | | | | 62/303 |
| 6,028,218 | A | * | 2/2000 | Samuels | C07C 37/70 |
| | | | | | 562/424 |
| 6,955,796 | B2 | * | 10/2005 | Saran | B09C 1/02 |
| | | | | | 210/710 |
| 7,494,592 | B2 | * | 2/2009 | Deskins | B01D 21/0012 |
| | | | | | 210/694 |
| 7,691,261 | B2 | * | 4/2010 | Deskins | B01D 21/2444 |
| | | | | | 210/97 |
| 9,585,419 | B2 | * | 3/2017 | Stromotich | A23L 3/54 |
| 2020/0010350 | A1 | * | 1/2020 | Ekstrand | C02F 11/20 |
| 2020/0158431 | A1 | * | 5/2020 | Trout | F26B 5/06 |
| 2020/0172565 | A1 | * | 6/2020 | Joshi-Hangal | F26B 5/06 |

* cited by examiner

METHOD AND ARRANGEMENT FOR DEWATERING SLUDGE

CROSS REFERENCE TO RELATED APPLICATION

This application claims priority to European Patent Application No. 18181726.3 filed on Jul. 4, 2018 and titled METHOD AND ARRANGEMENT FOR DEWATERING SLUDGE; the content of which is hereby incorporated by reference herein in its entirety.

TECHNICAL FIELD

The present disclosure relates to a method and an arrangement for dewatering sludge, and in particular to a method and an arrangement for dewatering sludge such that the sludge residue obtained from the method are characterized by having a high dry solid concentration.

BACKGROUND

In wet waste treatment, such as treatment of particulate liquid or sludge, the treatment process must be efficient in separating water from said particulate liquid or sludge, resulting in residue preferably having a high dry solid concentration. Such residue may be suitable for fertilization in agriculture.

Particulate liquid or sludge comprises aggregated flocs of particles separated from each other by freely flowing water, or "free" water. Free water can be removed relatively cheaply from the particulate liquid or sludge by mechanical dewatering systems. Water may also join with the aggregated flocs of particles. Such water is on the contrary much costlier to remove. The water having joined with the particle flocs may be categorized into three types: interstitial water (water in between particles of an aggregated floc or water held by capillary forces); surface water (water associated with a single particle by superficial forces); and bound water (water chemically bounded to individual particles). Conventional mechanical systems such as belt filter presses or centrifuges are capable of removing free water, interstitial water, and surface water. However, bound water can only be removed by thermo-chemical treatment. Such treatment is often expensive and may result in the sludge residues being infected with hazardous pathogens or chemicals. This causes a further issue in that further treatment is necessary in order to adequately deal with said pathogens or chemicals.

Hence, there is a need for an improved method of dewatering particulate liquid or sludge, which method is cost efficient, from which residue characterized by a high dry solid concentration is obtained.

SUMMARY

It is an object of the present disclosure to provide an improved solution that alleviates the mentioned drawbacks with present solutions. Furthermore, it is an object to provide a method and an arrangement for processing sludge into residue characterized by having a high dry solid concentration. The invention is defined by the appended independent claims, with embodiments being set forth in the appended dependent claims, in the following description and in the drawings.

According to a first aspect of the invention, a method for processing sludge to increase its dry solid concentration is provided. The sludge being provided for processing may be characterized in terms of at least one sludge characteristic. The method comprises the steps of: distributing the provided sludge for continuous transport in a specific form factor; cooling the distributed sludge into a frozen state using a refrigerating medium; thawing the frozen sludge using a first heating medium; drying the thawed sludge to a targeted dry solid concentration, wherein at least one aspect of the method is controlled by a processing parameter, wherein the distributed sludge is continuously transported at a transport speed during at least one of the steps relating to distributing, cooling, thawing, and drying, the method further comprising the step of monitoring at least one processing parameter, and adjusting at least one processing parameter with respect to a corresponding reference value based on said at least one sludge characteristic or a user input to improve sludge processing.

The word "sludge" is here used in a general sense as a collective term for various types of particulate liquids and sludges. In particular, by "sludge" it may be referred to wastewater activated sludges; chemical, or alum, sludges; and oily sludges, i.e. sludges having a substantial oil content. Further, any sludge may be characterized by at least one sludge characteristic. A sludge characteristic may quantify a particular aspect of a sludge, such as composition.

The processing of the provided sludge is carried out using a combination of steps comprising freezing, thawing, and drying. Such a method is capable of dewatering sludge resulting in residue having a relatively high dry solid concentration when compared to other conventional dewatering processes. This is due to water having the characteristic of expanding when transitioning from the liquid state to the solid state. In its solid state, the water molecules become organized in a crystallographic arrangement due to Coulomb force equilibrium between positive and negative concentrations of water molecules. Other types of molecules and particles will be reluctant in joining the crystallographic arrangement due to experiencing a sizeable stress arising from an asymmetry of the Coulomb force. Such outsider particles are thus more inclined to be rejected by the growing crystallographic arrangement in favor of incorporating more water molecules. Hence, water molecules and outsider particles become segregated when the sludge freezes.

Water molecules existing in any of the four categories of water (free, interstitial, surface, bond) in the sludge may be segregated when the sludge freezes. Further, due to the crystallographic structure, channels within the ice may form, thus facilitating the release of trapped liquid water. Further, when the frozen sludge is thawed, the segregated water may be melted and removed from the sludge particles through said channels while they exist. Over time, the frozen sludge thaws in full, leaving no frozen regions. If allowed to dry sufficiently, and removing the liquefied ice, a substantial dry solid concentration may be obtained.

As previously stated, the method involves a step of adjusting at least one processing parameter with respect to a corresponding reference value based on said at least one sludge characteristic or a user input to improve sludge processing. With the term "improving sludge processing", it may be meant that sludge processing is carried out while various processing aspects of the method satisfies targeted performance criteria or that various processing aspects of the method are adjusted to satisfy targeted performance criteria.

A targeted performance criteria may be selected with respect to energy consumption, power usage, processing speed, or solid dry concentration of the processed sludge. Other aspects of the method may be used as a target performance criterion as well. In the event that all targeted performance criterions are being satisfied, the method may further adjust itself to mutually rebalance each performance aspect being benchmarked against the targeted performance criteria such that a specific effect of sludge processing is improved. Furthermore, each targeted performance criterion may be assigned a specific priority, such that one targeted performance criterion has a higher priority over another targeted performance criterion. The method may take this priority into account when making adjustments.

Further, a processing parameter may refer to a parameter quantifying an aspect of the method, either the method as a whole and/or an aspect of each individual method step. Such aspects may be, but is not limited to, sludge characteristics of sludge being processed in any of the method steps and performance aspects of the method. A processing parameter may quantify an aspect of the method, either directly or indirectly. By quantifying directly, it may be meant that the processing parameter is based on a direct measurement of the aspect to be quantified. With the term "quantifying indirectly", it may be meant that the processing parameter is based on a measurement of a first aspect from which a quantity of a second aspect is deduced. Indirect quantification may also mean that a processing parameter corresponding to an aspect to be quantified is based on a plurality of measurable aspects different from the aspect to be quantified. For instance, a sludge transport speed may be directly measured, while other processing parameters may be only indirectly determined. Further, the processing parameter may be expressed either in the same unit of measurement as the process aspect quantified, be expressed as an equivalent parameter or be expressed as a ratio, or a percentage, relative a reference value. Further, a processing parameter value may comprise a momentarily parameter value, and/or a statistical parameter value based on a sample of consecutive measurements of a quantifiable aspect during a predetermined time duration. The statistical parameter value may for instance be an average value or a median value.

A reference value may be based on sludge characteristics. It may be based on user input, for instance targeted performance criteria of the method. A reference value may be based on current processing performance. The reference value may be determined by employing algorithms taking into account sludge characteristics, user input, and/or current processing performance.

A self-adjusting aspect of the method may be carried out by incorporating a feedback loop relating a processing parameter to a corresponding processing reference parameter value. A statistical processing parameter value may be related to the corresponding reference value. The process may be designed to determine a deviation between the processing parameter value and the corresponding reference value. The method may adjust a processing parameter such that the deviation between a processing parameter and a corresponding reference processing parameter is decreased. Processing parameters may each be associated by a priority value.

Initially, sludge to be processed is being provided. Sludge may be provided from a source environment, i.e. the environment said sludge was produced. The sludge may also be provided directly from a storage facility. The sludge may be provided from each respective origin by providing means, such as a pump, gravitational screwing, or by pressure. The sludge to be processed may also be provided via vehicle transport from such a source environment or storage facility. Information regarding the characteristics of the sludge may be provided along with the sludge. Alternatively, the sludge characteristics may be determined, or deduced, from measurements made to the sludge prior to being subjected to said distributing step. Said measurements may be performed manually or autonomously.

Depending on sludge characteristics, the sludge may be introduced into the process, either continuously or in batches. The size of each batch may be specified by an adjustable process parameter. Each batch may further correspond to a sludge having a particular set of characteristics. Each batch may also be associated with a batch-specific targeted dry solid concentration.

The sludge to be processed may optionally be pre-conditioned. By pre-conditioning, it may be meant that the sludge has been subjected to filtering, either mechanical or chemical, in order to remove certain particles prior to being provided. Larger particle objects may have been removed to facilitate sludge processing. Further, pre-conditioning may also comprise adding chemical substances to facilitate the dewatering process of the sludge. Provided sludge may also have been previously processed to increase its dry solid concentration.

Next follows a step involving distributing the sludge in a particular form factor. The sludge may be distributed into a particular form factor suitable for processing the sludge. Suitable form factors may be based on theory in view of the characteristics of the sludge to be processed and known or probable processing performance. Suitable form factors may be determined by trial and error during test runs. A pre-determined form factor may be selected based on at least one characteristic of the provided sludge. One such characteristic may be the composition of the provided sludge. The choice of form factor may specify shape and size. For instance, provided sludge may be distributed as discretized sludge portions in any suitable geometric shape or as a continuous slab wherein the dimensions of said slab is defined in terms of a width and a thickness.

Next follows a step involving cooling the sludge into a frozen state using a refrigerating medium. Cooling may be categorized as direct cooling and indirect cooling. By direct cooling, it may be meant bringing the sludge into direct contact with said refrigerating medium, such as a low temperature gas, or a mixture of gases, or a liquid refrigerant. In direct cooling, the sludge may come in contact with the refrigerating medium along multiple sides, thus increasing the contact surface area and thereby increasing the cooling rate. By indirect cooling, it may be meant using a heat transfer surface for facilitating heat transfer amongst the sludge and the refrigerating medium.

When subjected to cooling, either indirect or direct cooling, distributed sludge may be cooled into a frozen state. Optionally, the distributed sludge may be cooled gradually into a set of sequentially cooler temperatures. The distributed sludge may be kept at each sequential cooling temperature for a pre-determined time duration. Each pre-determined time interval may be specified by a process parameter, and may be adjusted. The temperature of the distributed sludge may be measured during the cooling. The temperature of the distributed sludge may be measured continuously, or at specific recurring time intervals. The specific time intervals may also be specified by a process parameter, and may be adjusted. In the case of direct cooling, the distributed sludge may be subjected to said refrigeration medium on at least one side. The flow direction of said refrigerating medium, as well as the flow speed, may be specified by a process parameter, and may be adjusted. The distributed sludge may be subjected to said refrigerating medium along multiple sides. Alternatively, the distributed sludge may be cooled using thermoelectric effect, such as Seeback effect, Peltier effect and/or Thompson effect. Depending on the geographic location wherein the ambient temperature is sufficiently low, the distributed sludge may be cooled and/or frozen outdoor. In this case, the refrigerating medium may be cold air. Further, distributed sludge may be actively cooled as described above and then moved outdoors for continued refrigeration.

Next follows a step involving thawing the frozen sludge using a first heating medium. Heating may be categorized as direct heating and indirect heating. By direct heating, it may be meant bringing the sludge into direct contact with a heating medium, such as high temperature gases or a liquid heating medium. In direct heating, the sludge may come in contact with the heating medium along multiple sides, thus maximizing the contact surface area and thereby increasing the heating rate. By indirect heating it may be meant using a heat transfer surface for facilitating heat transfer amongst the sludge and the heating medium.

In particular, the heating medium may be air having a temperature above the freezing temperature of the sludge, preferably hotter than +4 degrees Celsius. Other temperatures may be used as well. In the case of direct heating, the air flow may be directed toward the frozen sludge from any of the spherical angles. In the case of indirect heating, the air flow may be directed toward said heat transfer surface for transferring heat to the frozen sludge. The temperature of the air flow may be specified by a process parameter, which may be adjustable. Further, the rate of the air flow may also be specified by an adjustable process parameter. Further, the direction of air flow may also be specified by an adjustable process parameter. The process parameters specifying the heating may all be adjusted to improve the thawing of the frozen sludge. Due to the heating, the frozen water will transition either into vapor or liquid. Depending on geographic location wherein the ambient temperature is sufficiently high, the frozen sludge may thaw outside. In this case, the first heating medium may be air and/or sunlight.

Next follows a step involving drying the thawed sludge using a second heating medium. The thawed sludge is subjected to drying such that a targeted dry solid concentration is achieved. Vapor and liquid water resulting from the thawing of the frozen sludge is dispersed during the drying. The drying medium may be air having a temperature above the freezing temperature of the sludge, preferably hotter than +4 degrees Celsius. Other temperatures may be used as well. Further, the drying medium may have a suitable humidity, preferably having a relatively low humidity. In the case of direct heating, the air flow may be directed toward the thawed sludge from any of the spherical angles. In the case of indirect heating, the air flow may be directed toward a heat transfer surface to transfer heat to the thawed sludge. The temperature of the air flow may be specified by a process parameter, which may be adjustable. Further, the rate of the air flow may also be specified by an adjustable process parameter. Further, the direction of air flow may also be specified by an adjustable process parameter. Further, the drying medium humidity may be specified by an adjustable process parameter. Vapor may be removed from the vicinity of the thawed sludge by means of ventilation. In the case where an air flow is used to dry the thawed sludge, the vapor may be dispersed along with the air flow. Liquid water may be removed from the vicinity of the thawed sludge by means of gravity. Depending on geographic location wherein the ambient temperature is sufficiently high, the thawed sludge may be dried outdoors. In this case, the second heating medium may be air and/or sunlight. Further, the first and second heating medium may be of same nature or substance.

The first and/or the second heating medium may alternatively be radiation to which the sludge is exposed, such as electromagnetic radiation including microwaves and infrared radiation. The direction and effect of the radiation may each be specified by an adjustable process parameter.

The thawed sludge dries until a targeted dry solid concentration is reached. When reaching said targeted dry solid concentration, the majority of the segregated water has been removed.

An advantage of the present method over previous solutions such as conventional dewatering processes such as filter presses, belt presses, and decanter centrifuges is that a higher dry solid concentration of the sludge residue may be achieved. The dry solid concentration of the sludge residue may be sufficiently high so as to not being required to be subjected to further dewatering processing.

A further advantage of the present method over previous solutions is that the present method may be significantly more cost effective with respect to amount of sludge processed when adequate process parameter values are being used. The method may become increasingly more effective with resources to process sludge.

A further advantage of the present method over previous solutions is that the method may self-adjust to comply with requirements specified by a user or requirements being consequential due to characteristics of the provided sludge. The method may further provide an automatically controlled process using the specified measurements and parameters.

A further advantage of the present method is that a wide variety of sludge types may be processed, wherein each type may have different sludge characteristics. The method may adjust itself to be able to process sludge previous solutions are known to have issues with.

In one embodiment, the at least one processing parameter controls any of the following aspects: the form factor of the distributed sludge; the transport speed in the step relating to distributing, cooling, thawing or drying; an air humidity in the step relating to cooling, thawing, or drying; a time duration in the step relating to cooling, thawing or drying; the temperature of the first heating medium, or the refrigerating medium; said at least on sludge characteristic in any of the steps of the method, or the associated energy consumption in any of the steps of the method.

An advantage of said embodiment of the present method is an enhanced adjustability and improved control. By having a processing parameter controlling any relevant aspect of the sludge processing, each aspect may be controlled to improve sludge processing such that targeted performance criteria are met and exceeded. In the event that a second heating medium is used, i.e. a heating medium in the drying step, the at least one processing parameter may control that aspect as well.

In one further embodiment, said at least one sludge characteristic is one of the following characteristics: material composition, temperature, pH, density, moisture ratio, dry ratio, volatile solids content, filterability, suspended solids concentration, sludge volume index, sludge compaction and grain size distribution.

An advantage of said embodiment of the present method is that a greater variety of sludge may be more readily processed. The method may have a set of processing profiles, each processing profiles defined by a set of processing parameter values, wherein each processing parameter values has been selected such that the processing profile as a whole may be chosen when processing a particular type of sludge.

The processing profile selected may comprise processing parameter values being the most suitable for processing any given sludge type.

In one further embodiment, the form factor of the sludge being distributed is adjusted with respect to the material composition of the provided sludge.

An advantage of said embodiment of the present method is that the performance of the method may be more robust processing provided sludge which does not have a uniform material composition. Over time, as more and more sludge is being provided from a source, the material may change in composition thus having different material properties such as melting temperature point. By adjusting the form factor, for instance, the size, sludge portions having different material composition may still be processed simultaneously during the following steps of the process without noticeably impacting the performance of the method.

In one further embodiment, the provided sludge, when having a dry solid concentration equal to or above 8%, is distributed as a discretized sludge portion having a form factor substantially that of a cubicle, cylinder, hemisphere, triangular, spherical, a cuboid, or the like.

An advantage of said embodiment of the present method is facilitated processing during the steps of cooling, thawing, and drying. Furthermore, sludge characterized by having an initial dry solid concentration of 8-65% may be distributed in a form factor of discretized sludge portions. The discretized sludge portions may resemble a common shape as the ones disclosed previously. However, the sludge portions are not limited to these—other common shapes may be selected as well. By having the sludge being distributed in such a form factor, it may improve the energy consumption efficiency and other performance aspects of the method.

In one further embodiment, the side lengths of a resting side of a cubicle- or a cuboid-shaped sludge portion and their height are selected within an interval of 0.5 mm-75 mm.

An advantage of said embodiment of the present method is facilitated processing during the steps of cooling, thawing, and drying.

In one further embodiment, the provided sludge, when having a dry solid concentration less than 8%, is distributed into at least one container having a form factor substantially that of a hollow cubicle, cylinder, hemisphere, triangular, spherical, a cuboid, or the like.

An advantage of said embodiment of the present method is facilitated processing during the steps of cooling, thawing, and drying. Furthermore, the containers may be provided with a specific wall thickness. The containers may also be provided with a resting side thickness, either similar or different from the specific side wall thickness. The containers may be provided in a shape resembling cubicles or cuboids having a gauged interior. The containers may be provided in other suitable shapes as well. In the case where the containers are provided as cubicles or cuboids, the side lengths of a resting side and the height may be within the range of 0.5 mm-75 mm. The amount of sludge being distributed into each container may be adjusted by a process parameter. The process parameter may specify the volume of sludge being distributed into each container. The method may thus advantageously use containers of a specific size when processing sludge having different sludge characteristics. The containers may be placed on a conveyor to transport the sludge, or the conveyor may comprise a band being formed with integrated containers to receive sludge.

In one further embodiment, the sludge being provided is being provided at a sludge volume providing rate and the provided sludge at each consecutive step of the method is associated with a sludge volume processing rate, wherein the transport speed of the continuous sludge transport during said at least one step is adjusted such that the sludge volume providing rate and the sludge volume processing rate of the distributing step or the processing rate of two consecutive steps are substantially matched.

An advantage of said embodiment of the present method is that at least two consecutive steps of the method may operate at the same sludge volume processing rate which prevents bottlenecks from occurring, or at least reduces a risk of these occurring. By having at least two consecutive steps operate at the same sludge volume processing rate, it is possible to eliminate the need of storing the sludge in-between two consecutive step. Furthermore, the sludge volume processing rate may be substantially the same at each method step. This would further reduce the risk of bottlenecks and reduce costs associated thereto.

In one further embodiment, the transport speed is adjusted based on the composition of the provided sludge, in particular with respect to organic material and anti-freeze substances.

An advantage of said embodiment of the present method is facilitated processing of sludge. Depending on material composition, sludge may be more or less inclined to break when transported. By maintaining the form factor of the distributed sludge, effective processing may continue.

In one further embodiment, the flow direction and the temperature of the first and/or second heating medium is adjusted with respect to at least one sludge characteristic and/or form factor.

An advantage of said embodiment of the present method is enhanced energy efficiency. The energy required to heat the first and/or second heating medium may be adjusted to be the required amount for heating a specific type of frozen sludge, due to sludge characteristic or form factor it has been distributed as. Further, adjustment of the air flow direction may make the thawing and/or drying step more effective. Both energy consumption and time duration of each step for distributed sludge with respect to amount may be reduced.

In one further embodiment, the air flow is set equal to or greater than 200 $m^3/h$ and the air flow temperature is set equal to or greater than 15° C., more preferably the air flow is set equal to or greater than 500 $m^3/h$ and the temperature is set equal to or greater than 60° C., with respect to at least one sludge characteristic.

An advantage of said embodiment of the present method is improved sludge processing rate. With these process parameter values, the sludge volume processing rate of the thawing and drying step may be equal to the sludge volume processing rate of the cooling step. This may reduce the risk of bottlenecks occurring.

In one further embodiment, the provided sludge is stored in a storage area whenever the incoming sludge flow rate of the provided sludge exceeds the distributed sludge volume transport rate.

An advantage of said embodiment of the present method is the possibility of storing the provided sludge in the event that the capacity of the method put to practice is fully used, or overloaded. The sludge may then be stored in said storage area until further sludge processing may be carried out.

Further, the sludge may be moved to a storage area in-between any of the steps in the event that the capacity of any of the sludge processing steps is fully used, or overloaded. The sludge may in that case be stored in such a storage area until the following sludge processing step is ready for receiving the stored sludge.

In one further embodiment, a process parameter is continuously being measured, monitored and/or displayed.

An advantage of said embodiment of the present method is that it allows for enhanced communication of performance of the sludge processing. The method may act upon the measured, monitored, and/or displayed information to make further adjustments of the sludge processing. Further, it allows for a user to receive information about the performance of the sludge processing. The user may decide to act upon said information and make adjustments to the method. Such an adjustment, either made by the method autonomously or by a user, may be to improve sludge processing. It may further be to adjust priorities of processing parameters. It may further be to adjust processing performance criteria, or adjust the priority of at least one processing performance criterion. It may further be to add or remove a processing parameter and/or processing performance criterion. Hence, the method may be made more effective when put to practice to process sludge. The method may be adjusted to further satisfy the requirements of the sludge processing, either the processing performance criteria or other requirements.

In one further embodiment, the method further comprises a step, between the step of cooling the distributed sludge and the step of thawing the frozen sludge, of removing a part of the frozen sludge. The removed part may be a part of each distributed form of sludge. In sludge with low dry solid concentration, the sludge particles in the sludge may sink towards the bottom of the formed sludge. This may provide that ice (clear water phase) may be formed in a top part of the sludge. By removing this ice part from the sludge in frozen state, water that may melt to free water in the thawing step may be separated from the sludge beforehand, thereby reducing the amount of free liquid water to take care of later. The part to be removed from the sludge may for instance be removed using a saw device. After removal of a part of the sludge, the remaining sludge is proceeded to the thawing.

In one embodiment the method may further comprise a step of turning the frozen sludge before removing a part of the sludge. The removal of a part of the sludge on top of the formed sludge, for instance ice, may be facilitated if the sludge is turned upside down before removing said part.

According to a second aspect of the invention, an arrangement for processing sludge according to the first aspect of the invention, or any of its embodiments, is provided. This arrangement comprises: a distribution station configured to distribute the provided sludge into a desired form factor; a cooling station configured to cool the distributed sludge into a frozen state using a refrigerating medium; a thawing station configured to thaw the frozen sludge using a first heating medium; a drying station configured to dry the thawed sludge; a conveyor connecting at least two consecutive station, and configured to transport sludge at a specific transport speed; and a control unit configured to adjust at least one process parameter to improve sludge processing.

The control unit may comprise a central processing unit configured to execute a program reflecting the method according to the first aspect of the invention, or any of its embodiments. It may carry out the instructions resulting by said program by which adjustments to the sludge processing may be issued. The control unit may further comprise a memory unit configured to store information associated with the method, and information relating to how to access such stored information. The stored information associated with the method may comprise information relating to processing parameter, such as the number of used processing parameters, what type of processing parameters are being used, the momentarily and statistical value of each used processing parameter, logged values of time. Said stored information may also comprise information relating to processing performance, processing performance criteria, and other processing drift information. The processing unit may be configured to access and use the information of said memory unit. The processing parameters may relate to one or more of the form factor of the distributed sludge, the transport speed in the step relating to distribution, cooling, thawing or drying, an air humidity in the step relating to cooling, thawing or drying; a time duration in the step relating to cooling, thawing or drying; the temperature of the first heating medium, the second heating medium, or the refrigerating medium; at least one sludge characteristic in any of the steps of the process, or the associated energy consumption of any of the steps of the process.

The control unit may be communicatively connected to the distribution station, the cooling station, the thawing station, the drying station, and/or the conveyor. The control unit may control and/or adjust the performance of each of these devices.

Further, the control unit may be communicatively connected to a monitor for displaying information about the performance of the sludge processing. The monitor may be configured to receive said information about sludge processing performance to display it in real-time. The control unit may be communicatively connected to a plurality of monitors. Each monitor may be configured to display a specific aspect of the information provided. Further, each monitor may be configured to receive input from a user specifying what information is to be displayed.

The distribution station may be configured to receive sludge being provided and distribute it in a form factor in accordance with instructions issued by the control unit. The distribution station may be configured to distribute the provided sludge as discretized sludge portions having a predetermined form factor. The pre-determined form factor may be realized by the use of physical molds having a particular shape. The distribution station may be configured to distribute the provided sludge as discretized sludge portions having an adjustable form factor. The form factor may be adjustable via a form factor distributing device. Further, the distribution station may be configured to distribute the provided sludge as a continuous slab, wherein the width and the thickness of the slab is adjusted. The adjustable form factor may be adjustable via a form factor distributing device. The distribution station may be configured to distribute one discretized sludge portion at a time. The distribution station may be configured to output multiple streams of distributed sludge. The distributed sludge at each output stream may have a different characteristic. The distributed sludge at each output stream may have a different form factor. The distributing station may comprise a sensor for measuring a performance aspect of the distributing station. The distributing station may comprise a sensor for measuring a characteristic of the sludge, before or after being distributed.

The cooling station may be configured to receive distributed sludge and cool it to a temperature in accordance with instructions issued by the control unit. The cooling station may be configured to cool distributed sludge using a refrigerating medium. The refrigerating medium may be used to absorb heat from the distributed sludge to cool said sludge. The refrigerating medium having absorbed heat may be transported away from the sludge being cooled. The heat of the refrigerating medium may be transferred and re-used in the thawing and/or drying step. The heat of the refrigerating medium may be extracted using a condenser. The refrigerating medium may then be used to cool more sludge. The refrigerating medium may be transported along a pre-determined heat transfer cycle. The cooling station may comprise fans or turbines for transporting the refrigerating medium. The cooling station may comprise means for directing the refrigerating medium towards the sludge. Said directing means may be adjustable such that the direction of flow of the refrigerating medium may be adjusted. The cooling station may be configured to adjust both flow rate and flow direction of the refrigerating medium. The cooling station may be configured to cool multiple discretized sludge portions at a time. The cooling station may comprise a sensor for measuring a performance aspect of the cooling station. The cooling station may comprise a sensor for measuring a characteristic of the sludge, before, during, and after being cooled.

The thawing station may be configured to receive distributed sludge in a frozen state to thaw it to a thawed state in accordance with instructions issued by the control unit. The thawing station may be configured to heat the frozen sludge using a heating medium. The heating medium may be used to transfer heat to the frozen sludge. The heat of the heating medium may be provided at least in part by the heat absorbed from the refrigerating medium having absorbed heat. Further, the heating medium may be heated by chemical, electrical, and or mechanical means. For instance, the heating medium may be transported through a radiator. The heating medium may be transported along a pre-determined heat transfer cycle. The thawing station may comprise a fan or a turbine for transporting the heating medium. The thawing station may comprise means for directing the heating medium towards the frozen sludge to be thawed. Said directing means may be adjustable such that the direction of flow of the heating medium may be adjusted. The thawing station may be configured to adjust both flow rate and flow direction of the heating medium. The thawing station may comprise a sensor for measuring a performance aspect of the thawing station. The thawing station may comprise a sensor for measuring a characteristic of the sludge, before, during, and after thawing.

The drying station may be configured to receive thawed sludge to dry it to a dry solid concentration in accordance with instructions issued by the control unit. The drying station may be configured with means for allowing liquid to be drained from the thawed sludge. For instance, the drying station may comprise a meshed surface having orifices configured to allow drainage of liquid. The thawing sludge may be placed on said surface. The drying station may also comprise a fan for transporting the heating medium for drying the thawing sludge. Said fan may have an adjustable RPM such that the flow rate of the heating medium may be adjusted. The drying station may also comprise directing means for directing the flow of the heating medium onto the thawing sludge.

The conveyor may be configured to receive distributed sludge and transport said sludge in between two consecutive stations and through each respective station. The conveyor may extend through multiple stations. The conveyor may extend from the distributing station to the drying station. A conveyor may be configured to only extend from an input side of a station, through said station, to the output side of a station such that said conveyor may transport sludge being placed onto the conveyor through a station. A conveyor may be used to transport sludge in between station, to transport sludge from an output side of a first station to an input side of the following station. Such a conveyor may be configured to place sludge onto a conveyor of the corresponding station. A conveyor may operate at a transport speed. Said transport speed may be adjustable.

The arrangement may be configured to be in different operative modes, such as an OFF-mode in which the arrangement consumes no power, and an ON-mode in which the arrangement is ready process sludge, or is already processing sludge. The arrangement may be configured to be put in other modes as well, such as a SLEEP-mode. The mode of the arrangement may be controlled by said control unit.

The arrangement may be configured to process sludge autonomously for long periods of time without input from a user. Input of a user may only be required to initialize start-up of the arrangement from said OFF-mode or said SLEEP-mode.

According to a third aspect of the invention, a use of an arrangement according to previous embodiments is provided, said arrangement comprising a distribution station configured to distribute the provided sludge into a desired form factor; a cooling station configured to cool the distributed sludge into a frozen state using a refrigerating medium; a heating station configured to thaw the frozen sludge using a first heating medium; a drying station configured to dry the thawed sludge; a conveyor connecting at least two consecutive stations, and configured to transport sludge at a specific transport speed; and a control unit configured to adjust at least one process parameter to improve sludge processing.

BRIEF DESCRIPTION OF THE DRAWINGS

The invention will in the following be described in more detail with reference to the enclosed drawings, wherein.

DESCRIPTION OF EMBODIMENTS

Figure 1:
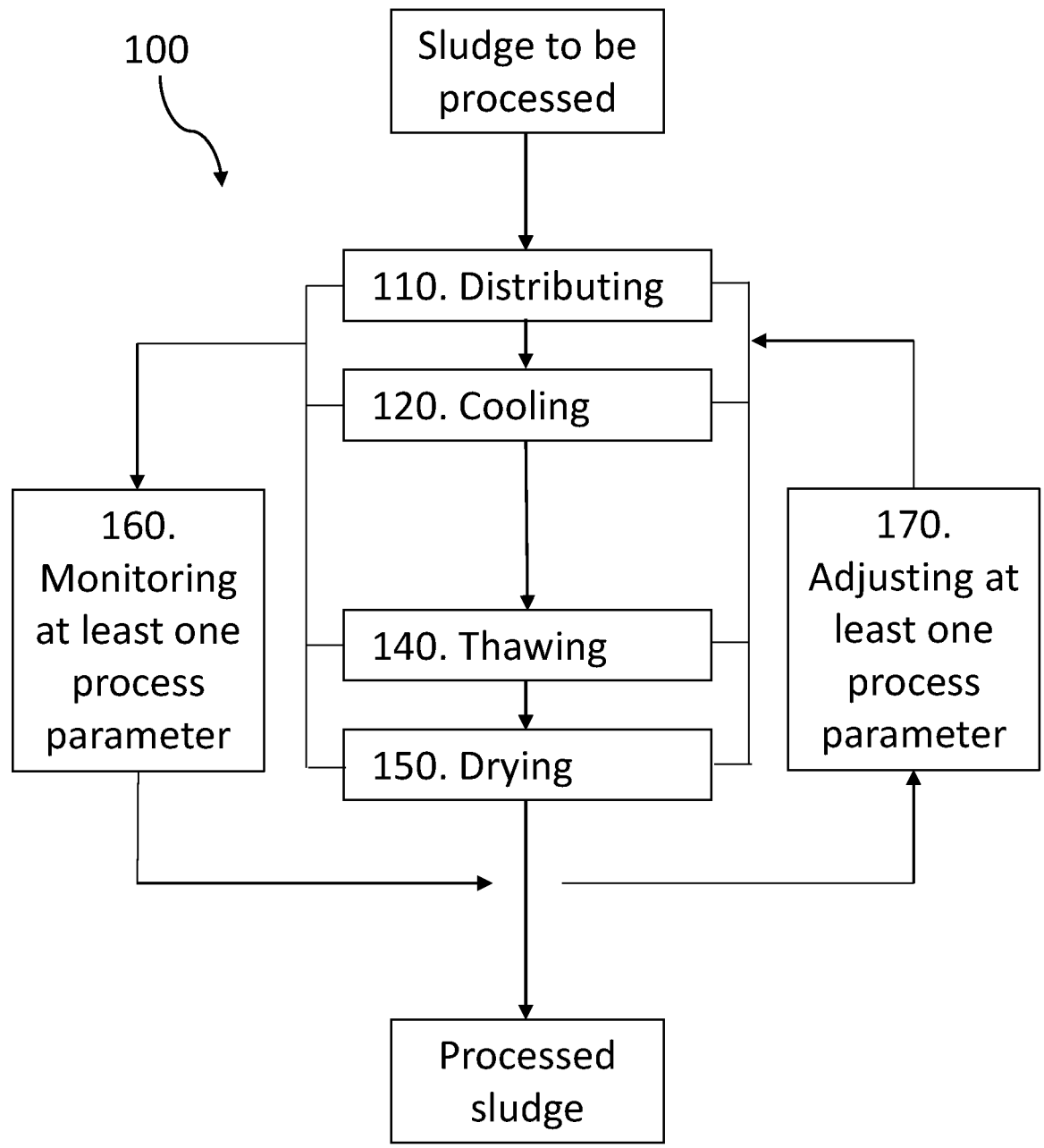
FIG. 1 shows a schematic view of the method according to one embodiment of the present invention.

The present invention will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The method 100 according to one embodiment of the present disclosure is illustrated as a schematic view in FIG. 1. The method 100 comprises a step 110 of distributing sludge 1 in a suitable form factor for continuous transportation; a step 120 of cooling distributed sludge 2 so that it freezes; a step 140 of thawing the frozen sludge 3 so that it melts; a step 150 of drying the thawed sludge 4 to obtain processed sludge, i.e. sludge residue 5 having a targeted dry solid concentration.

Furthermore, the method 100 comprises a step 160 of monitoring at least one process parameter and a step 170 of adjusting at least one process parameter to improve sludge processing.

Figure 2:
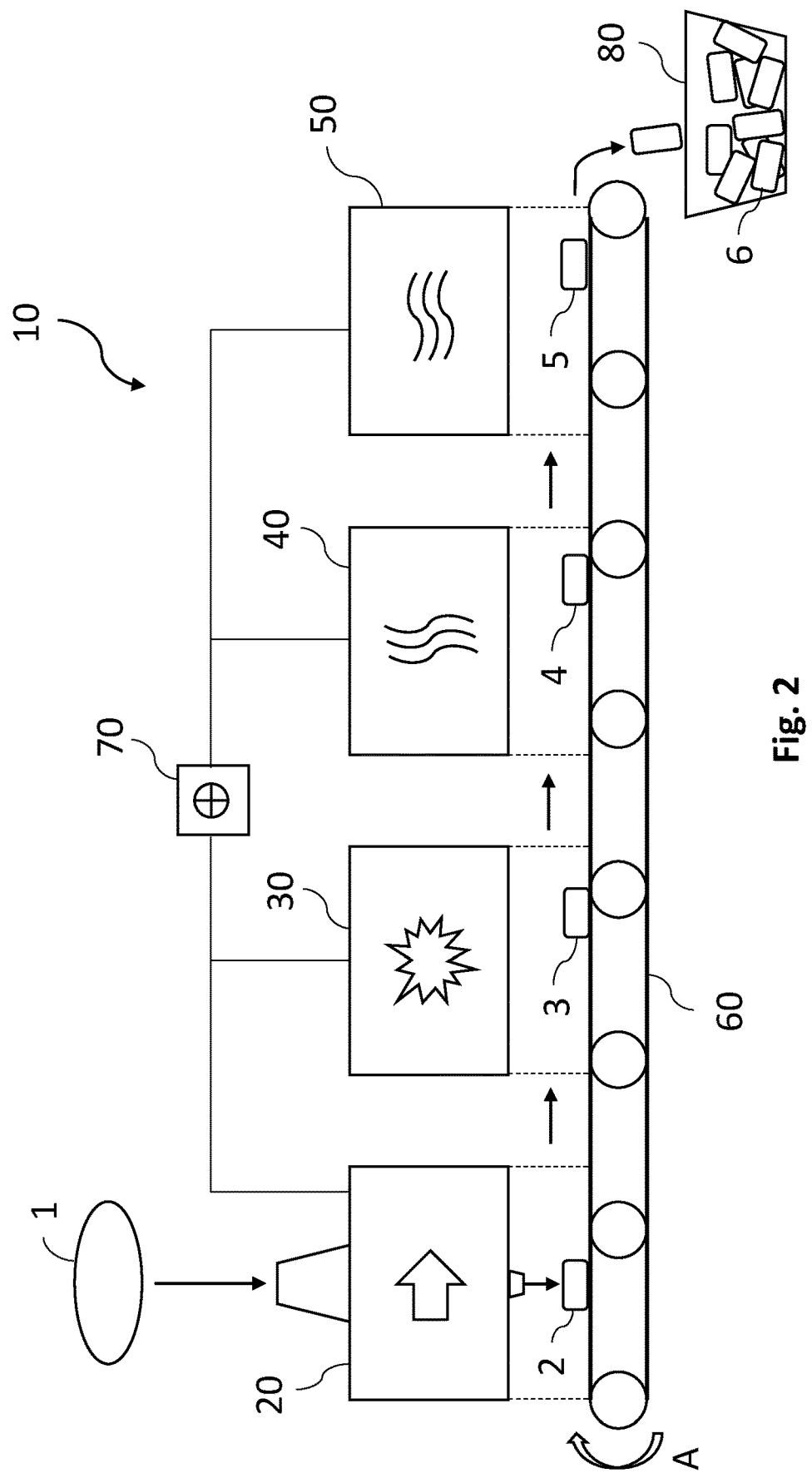
FIG. 2 shows a schematic view of the arrangement according to one embodiment of the present invention.

The arrangement 10 according to one embodiment of the present disclosure is illustrated as a schematic view in FIG. 2. Sludge to be processed is provided to the arrangement 10. Provided sludge 1 is fed into a distributing station 20 configured to distribute the provided sludge 1 in a suitable form factor. Preferably, the form factor of the distributed sludge 2 will be discretized sludge portions. The size and shape of the form factor of the discretized sludge portions are determined based on sludge characteristics and targeted performance criteria.

Further, a control unit 70 is communicatively connected to the distributing chamber 20, the cooling station 30, the heating station 40, the drying station 50, and the conveyor 60 (connection not shown), and is configured to adjust each unit such that sludge processing is improved. The controlling unit 70 may also be communicatively connected to a collecting unit 80 configured to collect sludge residue 6 having a targeted dry solid concentration.

The provided sludge 1 may have a dry solid concentration allowing for distributed sludge 2 to be stackable, i.e. distributed sludge 2 will maintain its form factor after having been distributed on a surface. Typically, in order for the distributed sludge 2 to be stackable, the provided sludge needs a dry solid concentration of 8% or more. In the event that the provided sludge has a lesser dry solid concentration, pre-determined containers are used in order to distribute portions. The volume of each sludge portion is adjustable by varying the fill height of sludge in each container.

The distributed sludge 2 is distributed onto a conveyor 60 for continuous transportation throughout the process. The conveyor 60 comprises a conveyor belt which is put into motion by rotating members rotating along a rotational direction A. All rotating members of a single conveyor 60 operates at the same rotational speed. The rotation of the rotating members defines a transport speed. The transport speed is adjustable. The transport speed is in the case when the provided sludge 1 is stackable based on organic composition and anti-freeze substances of the provided sludge.

The distributed sludge 2 is transported to a cooling station 30. At the cooling station 30, the distributed sludge 2 is cooled into a frozen state. Cooling is carried out using a refrigerating unit. The distributed sludge 2 is subjected to cooling until it is in a frozen state. The distributed sludge may be continuously transported when being cooled in the cooling station 30. The cooling station is configured to be able to cool sludge into a frozen state wherein provided sludge has a freezing temperature at least within the range of −35° C. to +1° C. The cooling station is configured to be capable of cooling sludge down to such temperatures. The cooling station may be configured to be capable of cooling sludge having a freezing temperature outside of this temperature range.

The frozen sludge 3 is transported to a heating station 40. At the heating station 40, the frozen sludge 3 is thawed. The heating is carried out using an air flow directed toward the frozen sludge.

The thawed sludge 4 is transported to a drying station 50. At the drying station 50, the thawed sludge 4 is dried. The thawed sludge 4 is dried sufficiently, i.e. it is dried until it reaches a targeted dry solid concentration. The drying is carried out using an air flow directed toward the thawed sludge.

At the heating station 40 and the drying station 50, the air flow rate and air flow temperature of each station is at least 200 m³/h and 15° C. respectively. In order to prevent bottlenecks during the process, an air flow rate of 500 m³/h and a temperature of 60° C. is used.

The separated water obtained from the step 140 of thawing or the step 150 of drying is collected during the process. The collected separated water is transported to desired recipient.

During the process, the control unit is configured to monitor each adjusted process parameter of each step and station. The information relating to the sludge processing is being monitored by the control unit or a separate monitoring unit communicatively connected to the control units. Information relating to temperature, visuals, material flow, distribution, material form factor, air flow, cooling temperature and heating temperature of respective medium is being monitored and presented to a user or a supervisor of the apparatus.

The invention claimed is:

1. Method for processing sludge to increase the dry solid concentration of the sludge, wherein provided sludge to be processed is characterized in terms of at least one sludge characteristic, the method comprising steps of:
   distributing the sludge for continuous transport in a specific form factor, providing a distributed sludge;
   cooling the distributed sludge into a frozen state using a refrigerating medium, providing a frozen sludge;
   thawing the frozen sludge using a first heating medium, providing a thawed sludge;
   drying the thawed sludge to a targeted dry solid concentration using a second heating medium,
   wherein at least one aspect of the method is controlled by a processing parameter, wherein the distributed sludge is continuously transported at a transport speed during at least one of the steps relating to distributing, cooling, thawing, and drying, the method further comprising steps of
   monitoring at least one processing parameter, and
   adjusting at least one processing parameter with respect to a corresponding reference value based on said at least one sludge characteristic or user input to improve sludge processing.

2. Method according to claim 1, wherein the at least one processing parameter controls any of the following aspects:
   a) a form factor of the distributed sludge;
   b) a transport speed in the step relating to distribution, cooling, thawing or drying;
   c) an air humidity in the step relating to cooling, thawing or drying;
   d) a time duration in the step relating to cooling, thawing or drying;
   e) a temperature of the first heating medium, a second heating medium, or a refrigerating medium;
   f) said at least one sludge characteristic in any of the steps of the method, or
   g) an associated energy consumption of any of the steps of the method.

3. Method according to claim 1, wherein said at least one sludge characteristic is one of the following characteristics: material composition; pH; density; moisture ratio; dry solid concentration; volatile solids content; filterability; suspended solids concentration; sludge volume index; sludge compaction; grain size distribution.

4. Method according to claim 3, wherein the form factor is adjusted with respect to the material composition of the provided sludge.

5. Method according to claim 4, wherein the provided sludge, when having a dry solid concentration equal to or above 8%, is distributed as a discretized sludge portion having a form factor substantially that of a cubicle, cylinder, hemisphere or a cuboid.

6. Method according to claim 5, wherein side lengths of a resting side of a cubicle- or a cuboid-shaped sludge portion and heights are selected within an interval of 0.5 mm-75 mm.

7. Method according to claim 1, wherein the provided sludge, when having a dry solid concentration less than 8%, is distributed into at least one container having a form factor substantially that of a hollow cubicle, cylinder, hemisphere or a cuboid.

8. Method according to claim 1, wherein the provided sludge is being provided at a sludge volume providing rate and the provided sludge at each consecutive step of the method is associated with a sludge volume processing rate, wherein a transport speed of a continuous sludge transport during said at least one step is adjusted such that the sludge volume providing rate and the sludge volume processing rate of the step of distributing or the processing rate of two consecutive steps are substantially matched.

9. Method according to claim 1, wherein a transport speed is adjusted based on a composition of the provided sludge.

10. Method according to claim 1, wherein flow direction and temperature of the first and/or the second heating medium is adjusted with respect to at least one sludge characteristic.

11. Method according to claim 10, wherein an air flow is set equal to or greater than 200 $m^3/h$ and an air flow temperature is set equal to or greater than 15° C., with respect to at least one sludge characteristic.

12. Method according to claim 1, wherein the provided sludge is stored in a storage area whenever an incoming sludge flow rate of the provided sludge exceeds a distributed sludge volume transport rate.

13. Method according to claim 1, wherein a process parameter is continuously being measured, monitored and/or displayed.

14. Method according to claim 1, further comprising a step of removing a part of the frozen sludge, between the step of cooling the distributed sludge and the step of thawing the frozen sludge.

* * * * *